United States Patent [19]

Batzel

[11] 4,275,800
[45] Jun. 30, 1981

[54] VEHICLE WITH VARIABLE HEIGHT CONTROL STATION

[76] Inventor: Stephen E. Batzel, 130 Vassar St., Reno, Nev. 89502

[21] Appl. No.: 79,952

[22] Filed: Sep. 28, 1979

[51] Int. Cl.³ .................... B60K 26/02; B62D 33/06
[52] U.S. Cl. .................................. 180/317; 175/219; 180/326; 180/89.13
[58] Field of Search ............. 180/317, 326, 327, 328, 180/89.13, 89.14, 89.15, 89.16; 296/190; 299/11, 12; 175/219; 405/293, 294; 414/914

[56] References Cited

U.S. PATENT DOCUMENTS

| | | | |
|---|---|---|---|
| 2,282,749 | 5/1942 | Russell | 180/317 |
| 3,479,080 | 11/1969 | Hilfiker | 296/35 B |
| 3,618,692 | 11/1971 | Stikeleather | 180/89.14 |
| 3,721,077 | 3/1973 | van der Lely | 180/327 |
| 3,765,500 | 10/1973 | Reeves | 296/190 |
| 3,885,643 | 5/1975 | Goodbary | 180/89.13 |
| 3,937,517 | 2/1976 | Donovan | 175/219 X |
| 3,944,098 | 3/1976 | Foote | 180/89.13 X |
| 3,957,165 | 5/1976 | Smith | 180/89.13 X |
| 4,018,473 | 4/1977 | Chalupsky | 296/190 |
| 4,022,026 | 5/1977 | Childress | 405/293 |
| 4,050,259 | 9/1977 | Childress | 175/219 X |
| 4,060,144 | 3/1977 | Teti | 180/317 |
| 4,078,629 | 3/1978 | Kutay | 180/89.13 |
| 4,146,106 | 3/1979 | Childress | 180/317 |

Primary Examiner—John A. Pekar
Attorney, Agent, or Firm—Cushman, Darby & Cushman

[57] ABSTRACT

A vehicle typified by a front-end loader is provided with a driver's cab that pivots up and down along a long pivot arm. This gives both high elevation for better visibility and low profile, e.g. for travelling or getting into low overhead places. The long pivot arm provides a lot of vertical adjustability for the cab, with relatively little tilting. The tilting that does occur may be accommodated by also adjusting the back rest of the operator. A system for pivotally attaching the cab roof is also shown. In one variation shown, the cab is mounted transversally, i.e. sideways to the normal travel direction of the vehicle; in another, the cab is oriented longitudinally. Preferably most or all of the shell of the cab is stationary and only the operator's station part thereof is vertically adjusted.

17 Claims, 9 Drawing Figures

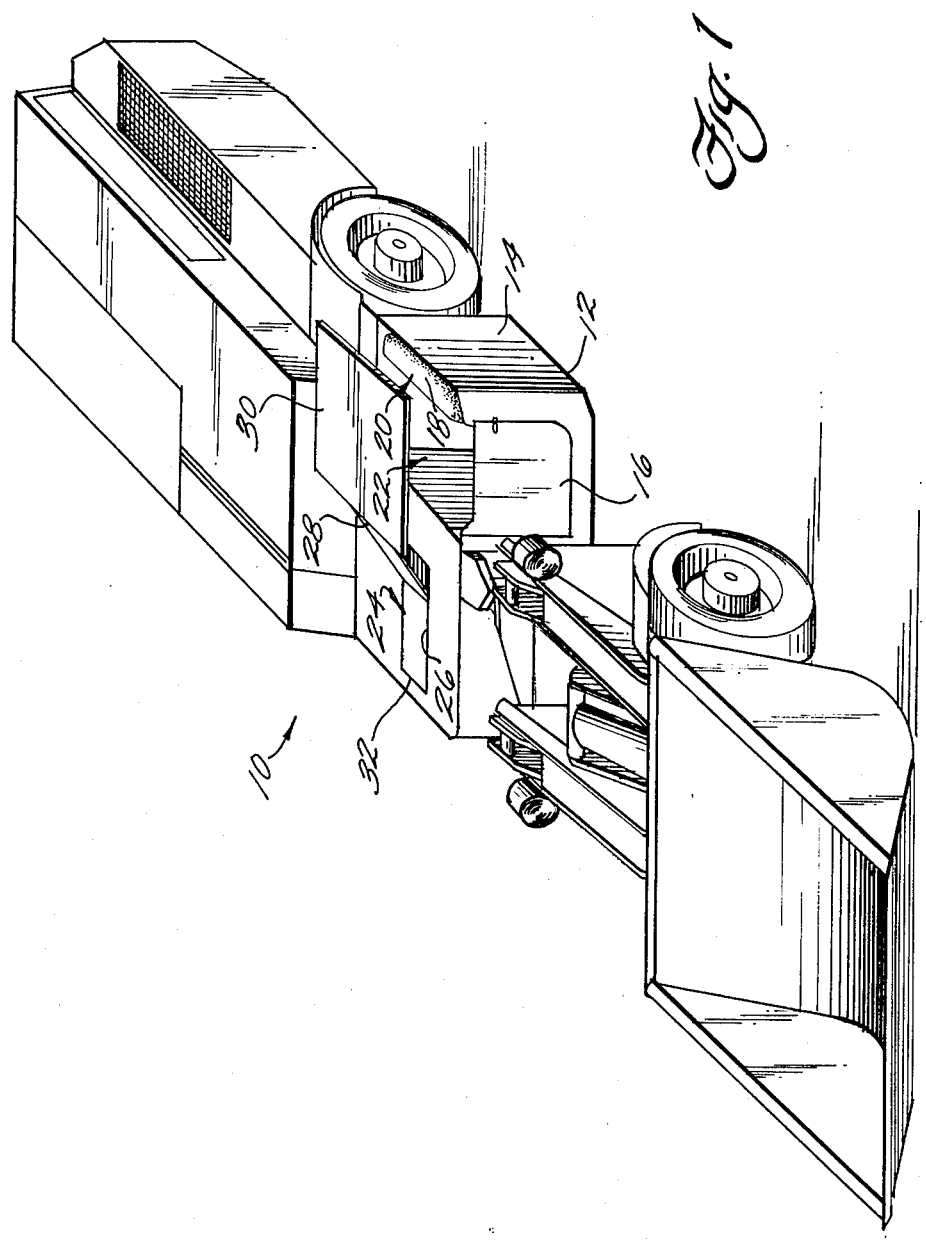

VEHICLE WITH VARIABLE HEIGHT CONTROL STATION

BACKGROUND OF THE INVENTION

Vehicle driver's cabs and similar control stations have been made to be of a variable height nature in the past, in two substantially different ways. One type commonly seen is the cab-over-engine type of truck cab, in which substantially the whole shell of the body may be tilted up in order to expose the engine and chassis for more convenient servicing. Most often with this sort of apparatus tilting up the cab disconnects many of the controls and at the least the vehicle cannot be operated while the cab is tilted up. This first type is not what the present invention is about.

The second kind of variable height vehicle cab is found most often on off-the-road vehicle, such as construction and mining machinery, where there is a need at some times for the machine to have a low profile, and a need at other times for the operator to be at a more elevated level so he or she has adequate visibility for the task at hand. With vehicles of this second sort it is essential that the vehicle be able to be driven or the machine to be otherwise operable in both modes, i.e. both while the cab is in its lower "low profile" mode and while the cab is in its upper "high visibility" mode. Often with vehicles of this latter sort, the cab may be raised or lowered to any intermediate position as well. The present invention primarily relates to this second sort of variable height vehicle cab.

The term "vehicle cab" is used generically herein to indicate not only the perch from which the vehicle is driven, i.e. where the "driver's seat" is located on a translatable, self-propelled machine, but also other operator work stations on equipment, such as the familiar, steering work station on the rear, towed unit of a "hook-and-ladder" fire truck; the bailing, binding, bagging or threshing or like work stations on agricultural implements; wheel houses on water craft such as river barges; drawbridge works-operating stations and the like.

SUMMARY OF THE INVENTION

A vehicle typified by a front-end loader is provided with a driver's cab that pivots up and down along a long pivot arm. This gives both high elevation for better visibility and low profile, e.g. for travelling or getting into low overhead places. The long pivot arm provides a lot of vertical adjustability for the cab, with relatively little tilting. The tilting that does occur may be accommodated by also adjusting the back rest of the operator. A system for pivotally attaching the cab roof is also shown. In one variation shown, the cab is mounted transversally, i.e. sideways to the normal travel direction of the vehicle; in another, the cab is oriented longitudinally. Preferably most or all of the shell of the cab is stationary and only the operator's station part thereof is vertically adjusted.

The principles of the invention will be further discussed with reference to the drawings wherein preferred embodiments are shown. The specifics illustrated in the drawings are intended to exemplify, ratherthan limit, aspects of the invention as defined in the claims.

BRIEF DESCRIPTION OF THE DRAWINGS

In the drawings:

FIG. 1 is an isometric view of a mining machine provided with a height-adjustable cab in accordance with the present invention. In this embodiment the cab is oriented transversally of the vehicle;

DETAILED DESCRIPTION

Figure 3:
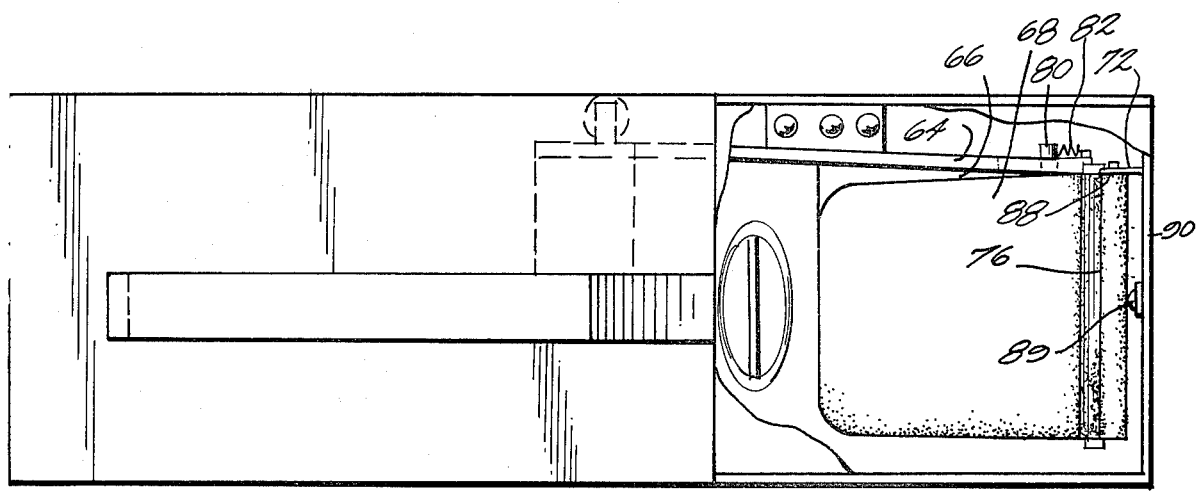
FIG. 3 is a diagrammatic top plan view of the apparatus of FIG. 2.

FIG. 1 shows a typical context in which the present invention may be put to use. Here, the vehicle 10 is a self-propelled, wheeled vehicle with a scoop at the front, designed for use in an underground mine. The cab of this vehicle, shown at 12 is aligned transversally of the vehicle. In effect, the driver faces to the right of the vehicle (i.e. leftwards in FIG. 1) and looks over his or her left shoulder when driving the vehicle forwards. This orientation although highly atypical of on-the-road vehicles, is well known in specialty vehicles, e.g. of the mining machine type. Accordingly, the cab 12 includes a lower, partially upwardly open shell 14 with an operator's entrance/exit door 16 at the front. Inside the cab, the seat back 18 of a seat unit 20 can be seen at one side of the largely open topped operator's compartment 22 within the cab. Beyond the opposite side of the operator's compartment, a cantilever arm 24 can be seen rising obliquely out of the shell through a slot 26 as it extends towards the operator's compartment. The upper end 28 of the arm 24 has a generally rectangular, generally horizontal roof plate 30 secured thereto at the center of one side edge of the roof plate, so that the arm 24 cantilevers the roof plate 30 over the largely upwardly open operator's compartment as a canopy therefor.

Although it is not clear from FIG. 1, the seat unit 20 and other structure is also mounted on the arm 24 and the arm 24 is mounted for pivotable movement about the lower end 32 thereof for raising and lowering the seat, operating controls, gauges and the like, and the roof all as a unit. In addition, the roof plate may be independently moved relative to the seat in order to provide more and less of a close canopy over the operator's compartment. More details are shown in the ensuing Figures.

Figure 2:
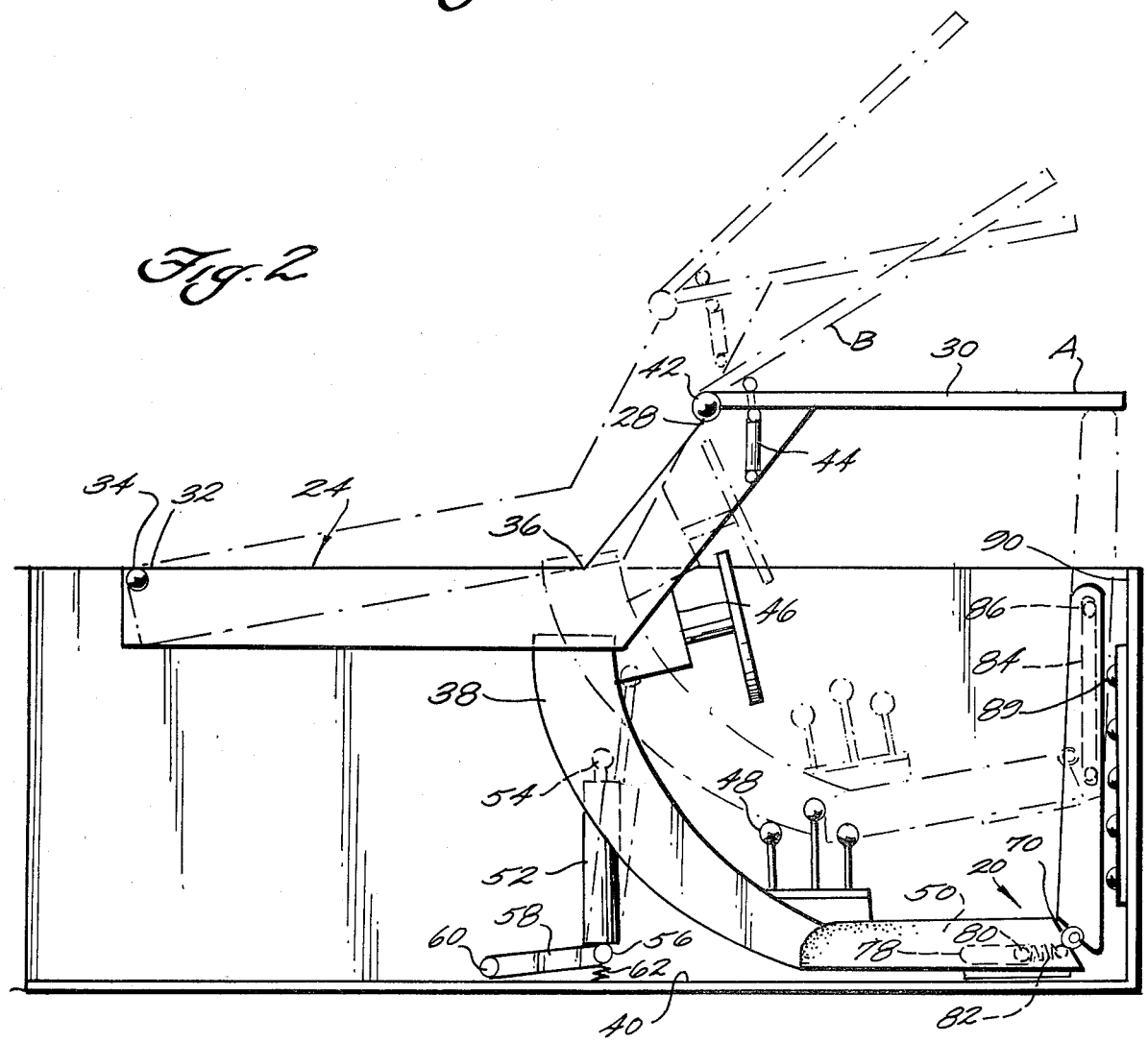
FIG. 2 is a diagrammatic fragmentary front elevational view of the cab region of the vehicle of FIG. 1.
Figure 5:
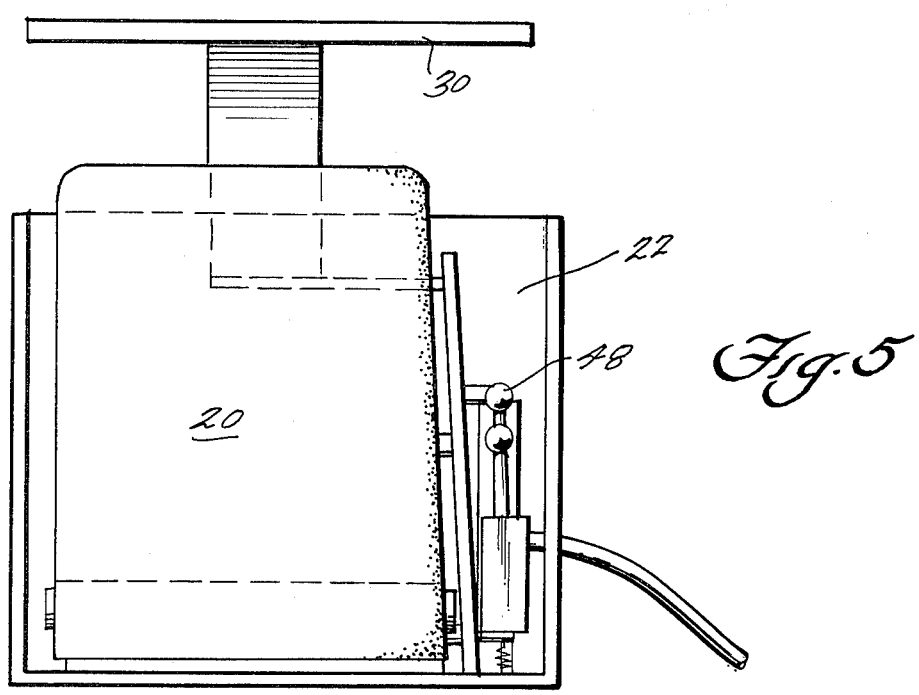
FIG. 5 is an enlarged fragmentary diagrammatic rear elevational view thereof.

Referring to FIG. 2, in which some of the cab shell is cut away in order to expose interior details, the arm 24 lower end 32 is seen to be pivotally secured to the vehicle body by horizontal axis pivot pin means 34. Midway along its length, the arm projects obliquely upwards at a bend 36. At the bend 36, a branch 38 extends downwards and into the operator's compartment where it traverses the compartment near the floor 40.

The roof plate 30 is pivoted at one edge by pin means 42 to the end 28 of the cantilever arm 24 distally of the pivoting of the arm 24 to the vehicle. At a site near, but radially displaced from the pivot axis 42 a pressurized fluid-operated, double acting piston/cylinder arrangement 44 is provided with its one end pivotally secured to the roof plate 30 and its other end pivotally secured to the arm 24 near the end 28. When the piston/cylinder arrangement 44 is extended and retracted the roof plate 30 is caused to move between lower and upper positions A and B, including all intermediate positions and to remain where positioned relative to the operator's seat until the piston cylinder arrangement 44 is operated again. Thus, as shown by the phantom and full line positions shown in FIG. 2 the roof plate 30 moves both with the arm 24 when the arm is pivoted up and down about the axis 34 and up and down relative to the arm 24 when the piston/cylinder arrangement 44 is operated.

The arm 24, here its lower branch 38, is seen to mount gauges 46 and controls 48 for the vehicle and a seat cushion bracket 50 so that all these elements move up and down as the arm 24 is pivoted up and down about the axis 34.

Intermediate the ends of the arm 24, another pressurized fluid-operated double acting piston/cylinder arrangement 52 is provided, this one for supporting the arm upon the vehicle chassis and providing for raising and lowering the arm by pivotal movement about the pivot axis 34. This piston/cylinder arrangement 52 also preferably incorporates a springing arrangement, as follows. The piston end of the arrangement 52 is pivotally secured at 54 to the arm 24 near the base of the lower branch 38. The cylinder end of the arrangement 52 is pivotally secured at 56 to a rigid link 58 which extends parallel to the arm 24 generally horizontally and towards the pivot 34. At its opposite end, the link 58 is pivotally secured to the vehicle chassis at 60. In this instance, springing is provided by a compression coil spring 62 mounted vertically between the chassis and the pivot pin 54.

The seat unit 20 seat cushion bracket 50 includes upstanding flanges 65 at opposite sides of a seat cushion supporting pan 66 and a seat cushion 68 is supported in the pan 66 between the flanges 64. To the right in FIG. 2, the seat unit 20 is shown to have a hinge 70 connecting between the flanges 64 and the respective similar flanges 72 of a seat back bracket 74 which further includes a seat back support 76 extending between the flanges 72.

The flanges 64 are shown each being provided with a generally horizontally extending slot 78 near the hinge 70. Each slot 78 receives a slidable follower pin 80 which is attached via a tension coil spring 82 to the respective seat back bracket flange 72 near the hinge 70. The purpose of the arrangement just described is to permit the seat cushion 68 to slide forward to a limited degree relative to the seat cushion bracket 50, yet bias the seat to the right (FIG. 2 orientation).

Further, the flanges 72 are shown each being provided with a generally vertically extending slot 84 near the hinge 70. Each slot 84 receives a slidable follower pin 86 which are fixed via respective brackets 88 to the end wall 90 of "behind" the seat unit 20, in the operator's compartment 22. Rollers may be provided at 89.

Accordingly, as the arm 24 is pivotally moved between its lower (solid line) and upper (phantom line) positions shown in FIG. 2, the seat elements are constrained to move between their solid line and phantom line positions as shown in FIG. 2.

Figure 8:
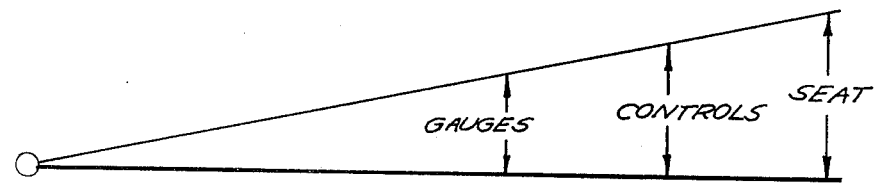
FIG. 8 is a diagram illustrating the relative movement of the gages, controls and seat of the preferred embodiment as the cab is raised and lowered between the low profile and high visibility positions thereof.

Because the gauges, controls and operator's seat are located increasingly further from the pivot axis 34 of the cantilever arm 24, these elements are raised and lowered by the same angular amount but different vertical amounts as is illustrated in FIG. 8. As will be understood, the longer the length of the arm between the pivot axis 34 and the seat unit 20 the greater will be the vertical movement of the seat for a given degree of rotation or the arm 24 about the pivot 34.

Figure 6:
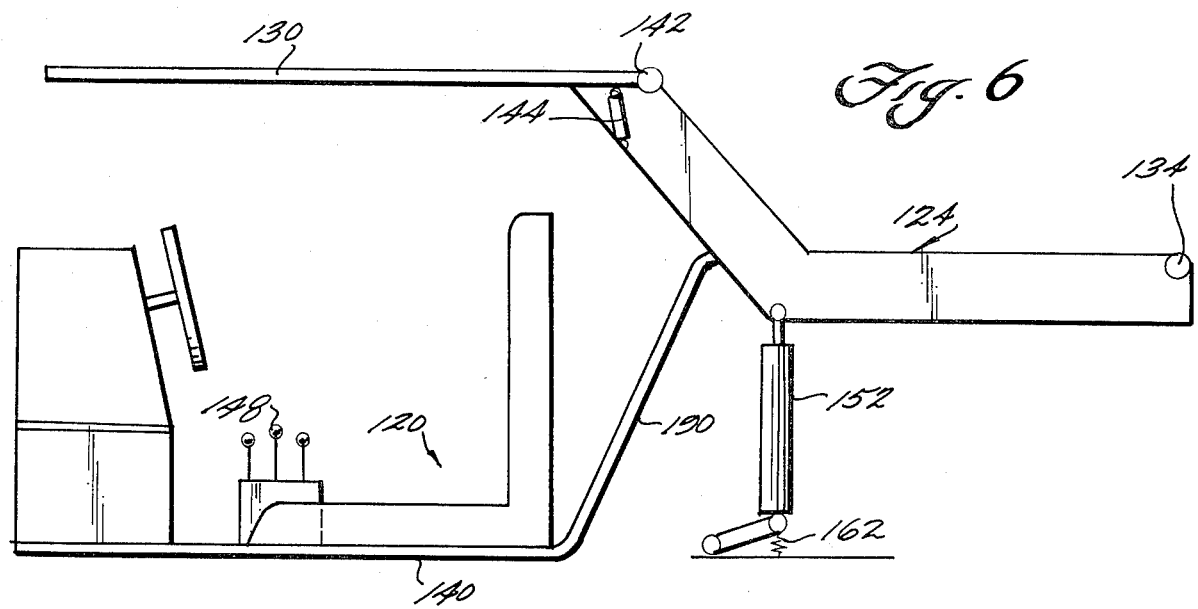
FIG. 6 is a diagrammatic left side elevational view of a second embodiment wherein the cab is oriented longitudinally of the vehicle.

In FIG. 6, a variation is shown for where the seat is to face forwardly on the vehicle and the vehicle seat, controls and gauges are mounted on a floor that is rigidly connected to the cantilever arm. In this version the seat unit is of fixed construction with no provision made for relative movement between the seat cushion and seat back. Comparable parts as illustrated are given like numbers, raised by 100 to permit comparison with FIGS. 1-5.

Figure 4:
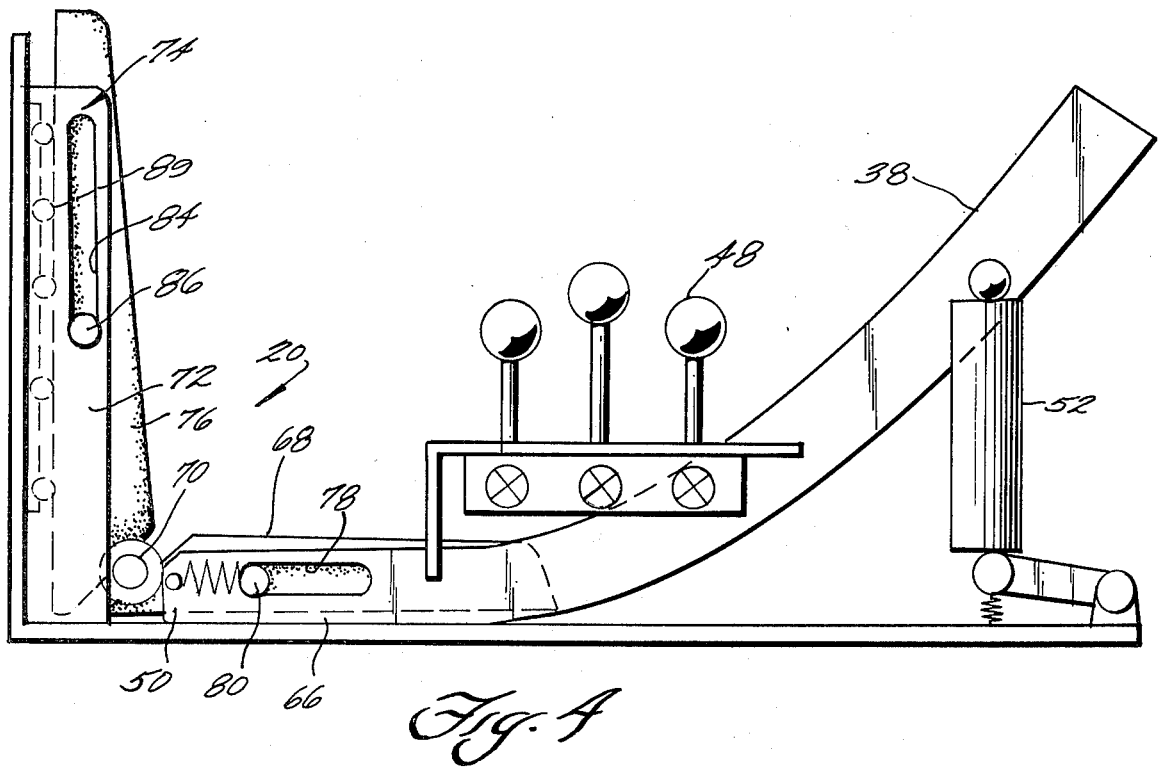
FIG. 4 is a diagrammatic left side elevational view thereof.
Figure 7:
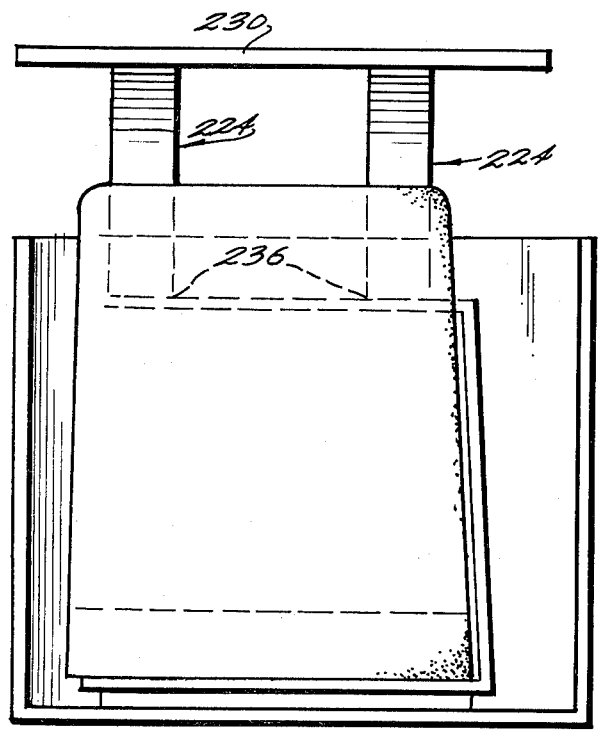
FIG. 7 is an elevational view similar to FIG. 4, but showing modification, applicable to either embodiment, in which the roof support is divided into two portions which are laterally displaced to permit viewing therebetween.

In FIG. 7 another variation is shown. It is particularly applicable to the FIG. 6 construction, but is also applicable to the FIGS. 1-5 embodiment if desired. What is the same as in FIG. 4 is given like numerals, raised by 200 for ease of comparison. Looking at FIG. 4, it is seen that the arm 24 is centered on the cab. While that will usually not be much of a distraction in the FIGS. 1-5 embodiment where the operator usually is not looking towards the arm but is looking to his or her left or right, it could more often be a distraction in the FIG. 6 situation, where the operator, more often, particularly from the bend 236, upwards may be bifurcated into two rigidly interconnected parts that are transversally spaced, so that the operator looking forwards has a clear view between them.

Various parts shown paired may be provided singly instead and various parts shown singly may be provided in pairs, all without departing from the principles of the invention.

Thus, the invention is seen to provide a simply constructed cab arrangement which can be moved up and down while in use. As the operator's perch is raised, so are the controls. Although the raising and lowering is by a simple pivotal movement, the pivot arm is sufficiently long relative to the vertical travel needed that vertical adjustment is accomplished with a negligible degree of tilting of the operator's perch. Further, the invention provides a roof for the operator's cab, which raises with the perch and may be raised and lowered relative to the perch to provide easier access and visibility, or more protection. In the preferred version the seat is automatically adjusted as the perch is raised and lowered in order to give the operator plenty of room. Thus, e.g. for an arm length of 5.4 feet (from pivot axis 34 to dead center of seat cushion 68) the seat cushion height at dead center may be raised and lowered typically by about 14 inches without causing the vehicle operator to be pitched uncomfortably forwards on the seat.

Figure 9:
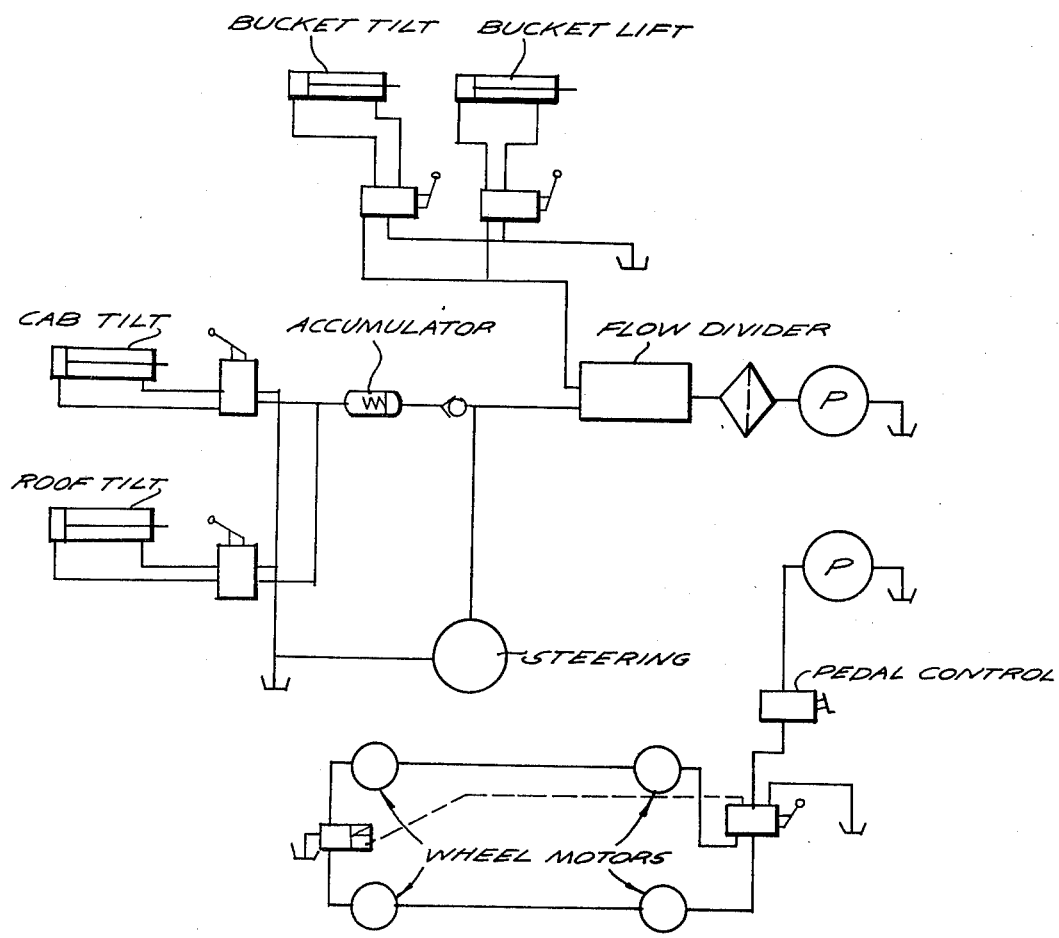
FIG. 9 is a simplified showing of a typical hydraulic circuit for the apparatus of the invention.

As illustrated in FIG. 9, the pressurized fluid circuits for operating the piston/cylinder arrangements 44 and 52 typically are branches of the existing pressurized fluid circuits conventionally provided on the vehicle, e.g. for steering, operating the scoop and brakes and the like. The working fluid may be hydraulic oil, air or any conventional working fluid. Preferably the circuits including the arrangements 44 and 52 are served by accumulator means 92 so that the operator's station and/or the roof plate may be raised and lowered even when the compress 94 for the pressurized fluid system is turned off, e.g. when the vehicle itself is turned off. By way of explanation it is noted that it is prefered that all controls and gauges that travel up and down with the operator's perch be interfaced with the rest of the vehicle via conventional flexible hoses, bowden wires and the like.

It should now be apparent that the vehicle with variable-height control station as described hereinabove, possesses each of the attributes set forth in the specification under the heading "Summary of the Invention" hereinbefore. Because it can be modified to some extent without departing from the principles thereof as they have been outline and explained in this specification, the present invention should be understood as encompassing all such modifications as are within the spirit and scope of the following claims.

What is claimed is:

1. For a vehicle which includes an on-board operator's work station, at which there is a cab having side walls and an open top, the improvement comprising:
   a generally horizontal cantilever arm having one end pivotally secured to the vehicle distally of the work station and having another end disposed adjacent the work station;
   extensible/retractable support means for extending between the arm, intermediate said ends, and the vehicle for supporting said arm at an adjustable and fixable elevation relative to said vehicle about said one end;
   an operator's seat and a set of operator's controls for the work station mounted to said arm for adjustable and fixable elevation together with said arm; and a cab roof secured to said arm and extending over said operator's seat and said set of operator's controls.

2. The vehicle improvement of claim 1, wherein:
   said set of controls includes controls for driving the vehicle regardless of the elevation of said arm.

3. The vehicle improvement of claim 2, further including:
   means pivotally securing the cab roof to the arm so that the cab roof may be pivoted up and down relative to the operator's seat for providing more and less clearance between the operator's seat and the cab roof.

4. The vehicle improvement of claim 3, further including:
   extensible/retractable support means extending between the cab roof and the arm for adjusting and fixing the elevation of the cab roof relative to the operator's seat.

5. The vehicle improvement of claim 4, wherein:
   both extensible/retractable support means comprise respective fluid pressure-operator piston and cylinder arrangements.

6. The vehicle improvement of claim 4, wherein:
   the operator's seat includes a seat cushion and a seat back; and
   further including:
   means for automatically relatively tilting the seat back backwards as the seat cushion is elevated and forwards as the seat cushion is lowered.

7. The vehicle improvement of claim 4, further including:
   means for springing the cantilever arm intermediate the ends thereof upon the vehicle.

8. The vehicle improvement of claim 7, wherein:
   the springing means is provided on the first-described said extensible/retractable support means.

9. The vehicle improvement of claim 3, wherein:
   said arm intermediate the ends thereof has an upward bend and a branch extending downwardly therefrom adjacent said upward bend;
   said operator's seat and said set of controls being mounted on said downwardly extending branch.

10. The vehicle improvement of claim 9, wherein:
    said downwardly extending branch of said cantilever arm includes a portion underlying the operator's work station as a floor for said cab.

11. The vehicle improvement of claim 9, wherein:
    at said bend, said arm divides into two laterally spaced elements between which the vehicle operator may view for driving;
    said cab roof being secured to both said laterally spaced elements of said cantilever arm.

12. The vehicle improvement of claim 11, wherein:
    said means pivotally securing said vehicle cab roof to said arm pivotally secures said roof to both said arm elements.

13. The vehicle improvement of claim 12, further including:
    extensible/retractable support means extending between the cab roof and the arm for adjusting and fixing the elevation of the cab roof relative to the operator's seat.

14. The vehicle improvement of claim 13, wherein:
    both extensible/retractable support means comprise respective fluid pressure-operated piston and cylinder arrangements.

15. A vehicle, comprising:
    an on-board operator's work station including a cab having side walls and an open top;
    a generally horizontally cantilever arm having one end pivotally secured to the vehicle distally of the work station and having another end disposed adjacent the work station;
    extensible/retractable support means for extending between the arm, intermediate said ends, and the vehicle for support said arm at an adjustable and fixable elevation relative to said vehicle about said one end;
    an operator's seat and a set of operator's controls for the work station mounted to said arm for adjustable and fixable elevation together with said arm; and
    a cab roof secured to said arm and extending over said operator's seat and said set of operator's controls.

16. The vehicle of claim 15, wherein:
    said arm extends transversally of the vehicle.

17. The vehicle of claim 15, wherein:
    said arm extends longitudinally of the vehicle.

* * * * *